May 1, 1962 S. J. BEGUN ETAL 3,032,765
MAGNETIC OSCILLOGRAPHY
Filed May 16, 1955 3 Sheets-Sheet 1

INVENTORS
SEMI JOSEPH BEGUN
THEODORE DE PARADOWSKY
JOHN B. GEHMAN
BY William J. Flynn
ATTORNEY May 1, 1962 S. J. BEGUN ETAL 3,032,765
MAGNETIC OSCILLOGRAPHY
Filed May 16, 1955 3 Sheets-Sheet 2

INVENTORS
SEMI JOSEPH BEGUN
THEODORE DE PARADOWSKY
JOHN B. GEHMAN
BY William J. F. Flynn
ATTORNEY INVENTORS
SEMI JOSEPH BEGUN
THEODORE DE PARADOWSKY
JOHN B. GEHMAN
BY William J. Flynn
ATTORNEY United States Patent Office 3,032,765
Patented May 1, 1962

3,032,765
MAGNETIC OSCILLOGRAPHY
Semi Joseph Begun, Cleveland Heights, Theodore De Paradowsky, Cleveland, and John B. Gehman, Chagrin Falls, Ohio, assignors to Clevite Corporation, Cleveland, Ohio, a corporation of Ohio
Filed May 16, 1955, Ser. No. 508,511
1 Claim. (Cl. 346—74)

This invention relates to magnetic oscillography, i.e., the graphic recording to electrical signals.

Until recently two general techniques have been employed for making a visual display of electrical signals. One of these techniques uses the cathode ray oscilloscope, which gives a temporary display of electrical signals of a periodic nature only. When a permanent visual record is desired the cathode ray screen must be photographed, with attendant expense and delay in processing the photographic film before the permanent visual record is available. The other technique employs a movable recording stylus in recording relation to a moving record chart, with provision for displacing the recording stylus in accordance with the amplitude of the electrical signal being recorded. Recorders of this type are limited to use at signal frequencies below a few hundred cycles per second because of the practical impossibility of producing the accelerating forces necessary to physically move the stylus rapidly enough to produce an accurate visual trace at higher frequency signals.

The present invention is directed to a novel graphic recording system and method which avoids the disadvantages inherent in the techniques previously used for the graphic recording of electrical signals. In the present system no physical motion of the recording element is required in order to translate the electrical input signal into a visual trace. Accordingly, the present invention is not subject to the rather stringent upper frequency limit inherent in stylus-type recorders. Furthermore, the system of the present invention offers many important practical advantages over the cathode ray oscilloscope and photography method mentioned above.

Accordingly, it is an object of the present invention to provide a novel and improved system and method for the graphic recording of electrical signals.

It is also an object of this invention to provide a novel system and method for the graphic recording of electrical signals which is adapted for recording electrical signals having frequencies in excess of a few hundred cycles per second, and which is also quite effective in recording lower frequency signals.

Another object of this invention is to provide a novel graphic recording system and method which has novel provision for producing a well defined, inked trace representing the signal recorded.

In the present invention the foregoing objectives are accomplished preferably by the provision of a premagnetized magnetic record tape which is recorded upon by a field-shifting magnetic recording head, such that when magnetic ink is applied to the record tape there is produced an inked trace on the tape which represents the signal recorded. If desired, this inked trace then may be transferred to a paper record chart.

Other objects and advantages of the present invention will be apparent from the following description of certain embodiments thereof, having reference to the accompanying drawings.

In an article in "Electronics" magazine, April 1952, pages 116–120, there is described a technique of magnetic recording called "boundary-displacement" magnetic recording. This recording system is adapted for the recording of both periodic and aperiodic phenomena, with a frequency response up to 100,000 cycles per second. In "boundary-displacement" recording technique disclosed in this article, there is provided a "field-shifting" magnetic recording head of special design which is capable of magnetically saturating the portions of an initially magnetically neutral record tape on opposite sides of a boundary area, the saturated areas having opposite polarization and the boundary area between them remaining substantially magnetically neutral. The position of this magnetically neutral boundary area on the record tape varies with the amplitude of the input signal to be recorded, so that along the length of this tape this magnetically neutral boundary area provides a trace of the input signal.

Figure 1:
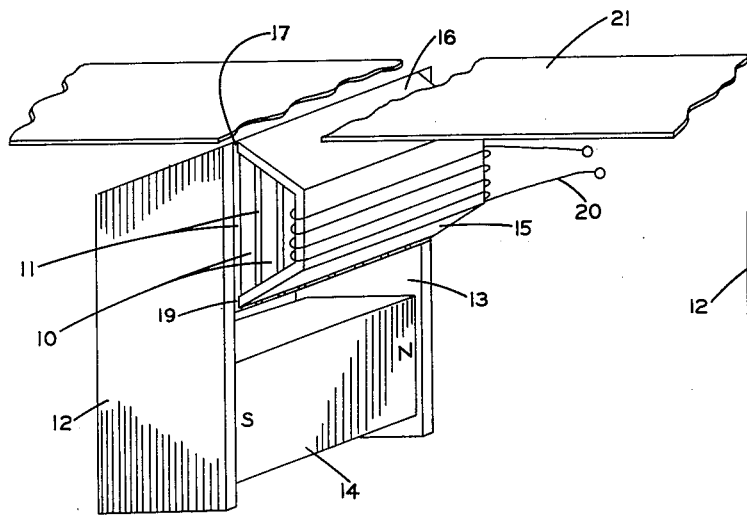
FIGURE 1 is a perspective view showing a field-shifting magnetic recording head in recording relation to a magnetic record tape for recording magnetically a signal from which a visual trace is to be made in accordance with the present invention.

FIGURE 1 illustrates a "field-shifting" recording head of the type adapted to produce such a "boundary-displacement" magnetic recording. This recording head comprises a series of laminations 10 of high permeability magnetic material separated by non-magnetic shims 11 and secured between soft iron plates 12 and 13. A magnet 14, which may be either a permanent magnet or an electro-magnet, is positioned between the plates 12 and 13 in spaced relation to the laminated structure, with its respective poles engaging the end plates 12 and 13 so as to induce magnetic flux which flows (from north to south) up through plate 13, through the successive laminations 10, 11, and down the other end plate 12.

A channel-shaped core member 15 of high permeability magnetic material is positioned in spaced confronting relation to the laminated structure 10, 11, with its upper leg 16 terminating in spaced confronting relation to the upper front end of the laminated structure to define therewith a recording gap 17. The bottom leg 18 on core member 15 terminates in spaced confronting relation to the lower front end of the laminated structure 10, 11 and defines therewith a back gap 19.

In accordance with a preferred embodiment of the present invention, each magnetic lamination 10 in the stack is about .004 inch thick, each non-magnetic shim 11 in the stack is of "Mylar" tape about .001 inch thick, the overall permeability of the stack of alternate magnetic and non-magnetic laminations 10, 11 is within the range from 2 to 12 (and preferably from 5 to 8), the core member 15 has a permeability of 100 or higher and is not easily saturable, and the distance across the recording gap from the laminated stack 10, 11 to the core member 15 is about .001 inch, this gap being filled with suitable non-magnetic dielectric material, such as "Mylar" tape.

A coil 20, to which is applied the input signal to be recorded, is wound around the core member 15. The magnetic record tape 21, on which the "boundary-displacement" recording is to be made, is mounted for movement across the recording gap 17, with the direction of movement of the tape being perpendicular to the direction in which the recording gap is elongated.

Figure 3:
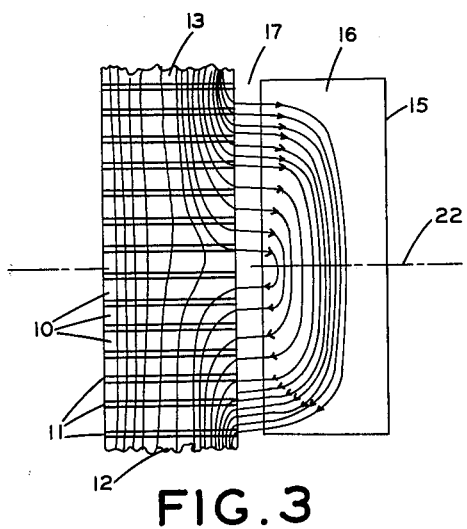
FIGURE 3 is a view on an enlarged scale showing schematically the magnetic flux pattern in the FIG. 1 head at the recording gap in the absence of an input signal.

In the operation of this apparatus, referring to FIG. 3, when no input signal is applied to the coil 20 the only magnetic flux through the head is that induced by the magnet 14. This flux passes from the north pole of the magnet up through end plate 13 and lengthwise through the assembly of magnetic laminations 10 and non-magnetic shims 11. If the permeability of this laminated head structure is appropriately chosen, a portion of this magnetic flux will leak across the air gap at the recording gap 17 and will flow through the low reluctance path provided by the upper leg 16 of the head member 15. This leakage flux is most highly concentrated adjacent the ends of the recording gap and diminishes toward the middle. Assuming that the head structure is symmetrical, this leakage flux flows across the recording gap 17 in one direction at one side of the center line 22 of the head structure and in the opposite direction across the recording gap 17 at the opposite side of this center line. Thus, if the recording head were positioned in recording relation to the record tape at this time, the head would record on one side of its center line a signal having one magnetic polarity and at the opposite side of its center line a signal having the opposite polarity. Substantially no signal would be recorded at the portion of the tape passing over the center line of the head structure because this region is substantially magnetically neutral.

Figure 2:
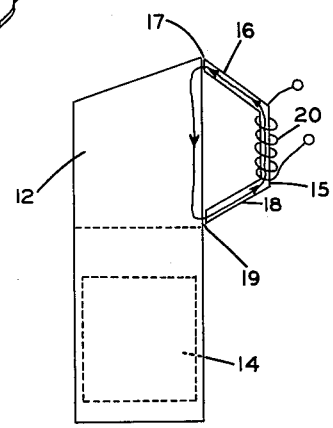
FIGURE 2 is an end view of the recording head of FIG. 1.
Figure 4:
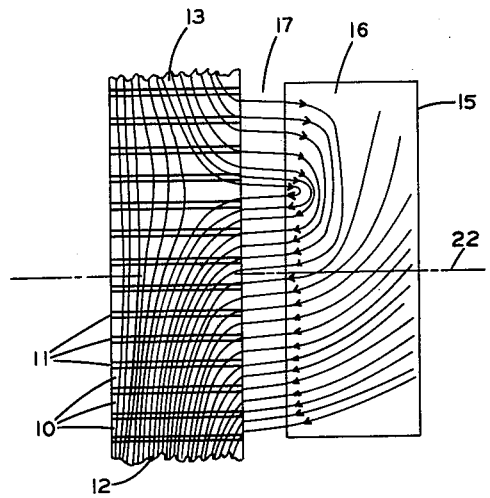
FIGURE 4 is a similar view showing the flux pattern at the recording gap at an instant when an input signal is applied.

Now, referring to FIGS. 2 and 4, if an electrical input signal is applied to coil 20 this coil will induce in the core structure of the head a magnetomotive force which causes a magnetic flux to flow in the direction shown in FIG. 2. This signal flux flows across the recording gap 17 in one direction and returns across the back gap 19 in the opposite direction. In the absence of the flux induced by magnet 14, this signal flux would be in the same direction and of substantially uniform flux density along the entire length of the recording gap 17. It will be apparent that the signal magnetomotive force at one side of the center line 22 of the head adds to the magnetomotive force induced by magnet 14 and the resultant vector sum of these magnetomotive forces produces increased leakage flux across the recording gap 17. At the other side of this center line the signal M.M.F. subtracts from the M.M.F. produced by the magnet to produce reduced leakage flux across the recording gap thereat. The magnetically neutral portion of the recording gap 17 is at the location where the signal magnetomotive force is equal and opposite to the magnetomotive force induced by magnet 14. This area of magnetic neutrality depends upon the instantaneous amplitude and sign of the input signal applied to coil 20. Accordingly, the region of magnetic neutrality at the recording gap 17 follows the amplitude of the input signal applied to coil 20. For a sine wave input signal, this region of magnetic neutrality on a constant speed record tape 21 would be in the form of a sine wave. At one side of this sine wave on the record tape the magnetization on the tape is in one direction, while on the opposite side of this sine wave the magnetization of the tape is in the opposite direction.

A visual trace of this recorded sine wave can be made by applying to the record tape magnetic ink, containing iron particles in a suitable liquid medium. On this visual record the time axis extends lengthwise along the tape and the signal amplitude axis extends transversely across the tape. However, this visual trace is not satisfactory for oscillographic purposes for several reasons:

(1) The trace is an uninked portion on an inked background;
(2) This uninked portion is discontinuous and produces a step-like trace;
(3) The uninked trace is too wide, so that the definition of the recording is unsatisfactory.

In accordance with the present invention the quality of recording using the "boundary-displacement" technique above described is substantially improved by premagnetizing the record tape with a particular saturating D.C. field prior to recording the input signal magnetically and by suitably providing that only the flux appearing across the recording gap of the recording head affects the record tape. Four types of premagnetizing in accordance with the present invention are described hereinafter.

*Longitudinal Premagnetization*

When the record tape is longitudinally premagnetized it is left with a remanent induction which extends lengthwise along the tape in the direction of the tape movement and no magnetic poles are formed on the surface of the tape. If magnetic ink is applied to a longitudinally premagnetized tape, the iron particles in the ink are not attracted.

When a longitudinally premagnetized record tape is recorded upon by a field-shifting head of the type shown in FIG. 1 without any input signal applied to the input coil 20, the direction of magnetic remanence on the record tape remains the same at one side of the center line of the recording head, but is reversed at the other side of this center line. Asuming for purposes of this discussion that the flux density across the recording gap varies linearly along the length of the recording gap, the magnetic field impressed by the recording head is represented by the line 30 in FIG. 6. At one side of the center line of the head the flux passing across the recording gap is in one direction and at the other side of this center line the flux across the recording gap is in the opposite direction. The flux density at various points along the recording gap is represented by the series of vertical arrows in FIG. 6 which have lengths corresponding to the respective flux densities. The line 30 in FIG. 6 therefore represents the flux across the recording gap.

Figure 8:
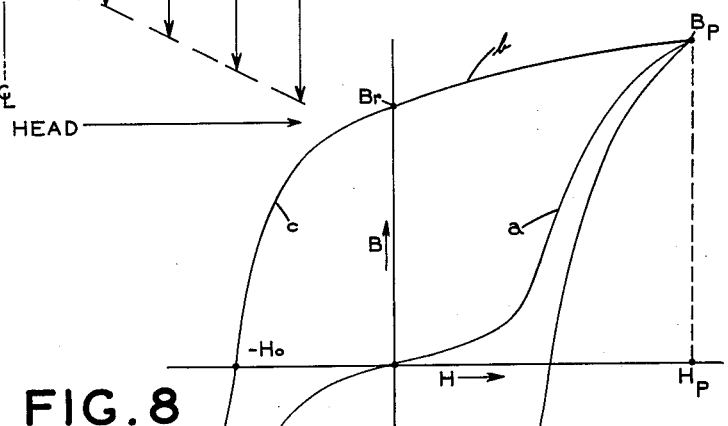
FIGURE 8 shows a hysteresis curve for the magnetizable material in the magnetic record tape.

Referring to FIG. 8, which shows the hysteresis curve for the magnetizable material in the record tape, if the record tape has been longitudinally premagnetized by applying to it a magnetizing force $H_p$, while this magnetizing force is applied the magnetic induction in the tape increases along the portion $a$ of the hysteresis curve until it reaches the value $B_p$. Upon removal of the record tape from the premagnetizing field, the remanent field in the record tape decreases along the portion $b$ of the hysteresis loop to the value $B_r$, which is the remanent induction in the record tape after the premagnetizing force has been completely removed. Preferably, the premagnetizing force is so chosen that at this value of remanent induction, $B_r$, the record tape is magnetically saturated.

Figure 6:
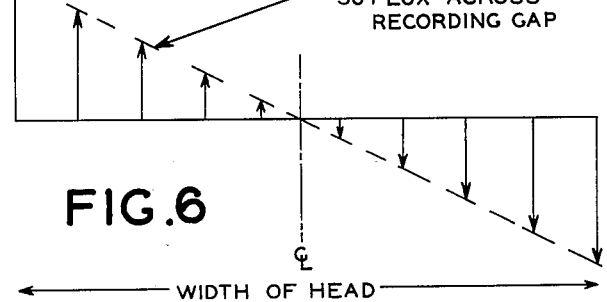
FIGURE 6 is a schematic diagram showing the flux density across the recording gap in the absence of an input signal to the recording head.

The flux across the recording gap in the recording head at the left side of the center line in FIG. 6 produces a magnetization in the tape which is in the same direction as that produced by the premagnetizing force. Therefore, if the premagnetized record tape is passed across the recording gap, the magnetization of the record tape at the left side of the center line of the head will remain at the remanence saturation value, $B_r$, as shown in FIG. 7.

Immediately to the right of the center line of the recording head the field direction of the magnetic flux across the recording gap of the head is opposite to the field direction of the remanent induction in the record tape caused by the latter's premagnetization. In effect, therefore, as the record tape moves past the recording gap, an opposing magnetizing force is applied to the magnetizable material in this portion of the record tape, the magnitude of this opposing magnetizing force increasing in accordance with the flux line 30 in FIG. 6 to the right of the center line of the head. The condition of magnetization of the magnetizable material in the record tape follows the portion $c$ of the hysteresis loop in FIG. 8 and at some point dispalced to the right of the center line of the recording head the magnetization in the tape is zero, this being the point at which the flux across the recording gap is equal to $-H_0$. Upon movement of the record tape past the recording head the remanent induction in this position of the tape is as shown at $c$ in FIG. 7.

At points across the record tape further to the right of the center line of the recording head the increased magnetizing force induced by the magnetic flux across the recording gap of the head causes the magnetization in the tape to follow the portion $d$ of the hysteresis curve (FIG. 8) until it reaches the point $e$. Upon movement of the tape beyond the recording gap, the remanent induction in this portion of the record tape is as shown at $d$ in FIG. 7.

Figure 7:
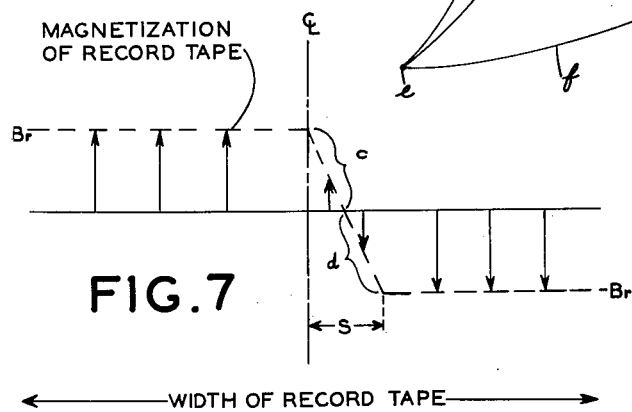
FIGURE 7 is a schematic view showing the magnetization in the record tape across the latter's width when the tape has been longitudinally premagnetized, followed by the recording of an input signal.

The portion of the record tape at the extreme right in FIG. 7 has a magnetizing force applied to it by the flux across the recording gap of the head which leaves a remanent magnetization, $-B_r$, that magnetically saturates this portion of the record tape.

From FIG. 7 it will be apparent that after the tape has been longitudinally premagnetized and moved across the recording head as described, with no input signal being applied to the recording head, the left half of the tape has a remanent longitudnial magnetization $B_r$, immediately to the right of the center line of the record tape the remanent longitudinal magnetization in the tape decreases sharply from the value $B_r$ to the value $-B_r$, and to the right of this intermediate portion the record tape has a remanent longitudinal magnetization $-B_r$. The width of the region $s$ across the tape between oppositely polarized, saturated portions of the tape depends upon two factors: the slope of the flux line 30 in FIG. 6 and the slope of the portions $c$ and $d$ of the hysteresis curve of the magnetizable material in the record tape, shown in FIG. 8. The smaller this distance $s$, the more effective this system is for the recording of a well defined single line.

The advantageous results accruing from the premagnetization of the record tape will be apparent from a consideration of the hysteresis curve in FIG. 8. In the absence of premagnetization, when the tape would be subjected to the magnetizing force produced by the recording head, the magnetization of the magnetizable material in the record tape would follow the portions $a$ and $g$ of the hysteresis curve. On both of these portions of the hysteresis curve it is necessary to apply a very considerable magnetizing force, H, before there is a substantial change in induction, B. Because of this, and because of the fact that the record tape has a threshhold value of magnetization which must be exceeded before a remanent magnetization is left on the tape, the magnetically neutral zone on the tape tends to be unduly wide in the absence of premagnetization of the record tape. Therefore, the visual trace on the resulting visual record also would be unduly wide and would be unsuitable for most practical applications of oscillography.

Figure 5:
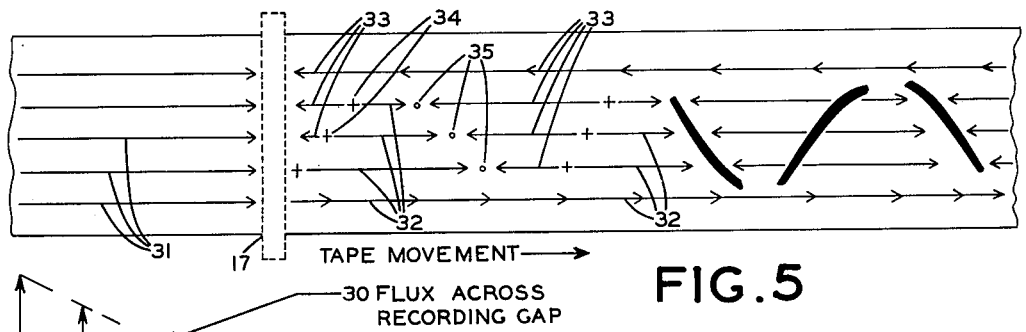
FIGURE 5 is a schematic view showing the magnetization in a record tape subjected to longitudinal premagnetization, followed by the recording of a sine wave input signal.

When the record tape has been longitudinally premagnetized before being recorded upon, the magnetic field in the tape is all in one direction, as indicated by the arrows 31 in FIG. 5. After moving across the recording gap 17 on the recording head, at one side of the sine wave input signal recorded by the head the magnetic field in the tape is in the same longitudinal direction as it was premagnetized, as indicated by the arrows 32 in FIG. 5. At the opposite side of the recorded sine wave the magnetic field in the tape is in the opposite longitudinal direction, as indicated by the arrows 33 in FIG. 5. The recorded sine wave is located in the boundary region between these oppositely directed longitudinal magnetic fields in the record tape. At the recorded sine wave the resultant magnetic fields, caused by oppositely directed longitudinal magnetic fields, are directed perpendicular to the plane of the record tape. These external perpendicular fields are designated respectively in FIG. 5 by a series of plus signs 34 (indicating a field directed into the tape) and circular dots 35 (indicating a field directed out of the tape).

When magnetic ink is applied to the record tape the magnetizable particles in the ink are attracted by these external perpendicular fields and form a visual inked trace of the recorded sine wave. The remaining portions of the record tape, which have only longitudinal magnetic fields lying substantially wholly within the tape, do not attract the ink magnetically, but provide a clear, uninked background.

In practice, it has been found that the visual trace tends to disappear at the positive and negative peaks of the recorded sine wave, as shown in FIG. 5, because at these points the perpendicular magnetic fields on the record tape approach zero. This can be avoided by superimposing on the recording head a low amplitude excitation signal having a suitable frequency many times that of the signal to be recorded. Due to this superimposed signal a series of distinct opposite magnetic poles are formed all along the magnetically neutral boundary region on the record tape and the magnetic ink forms a visible trace along the entire length of this boundary region.

*Perpendicular Premagnetization*

Figure 9:
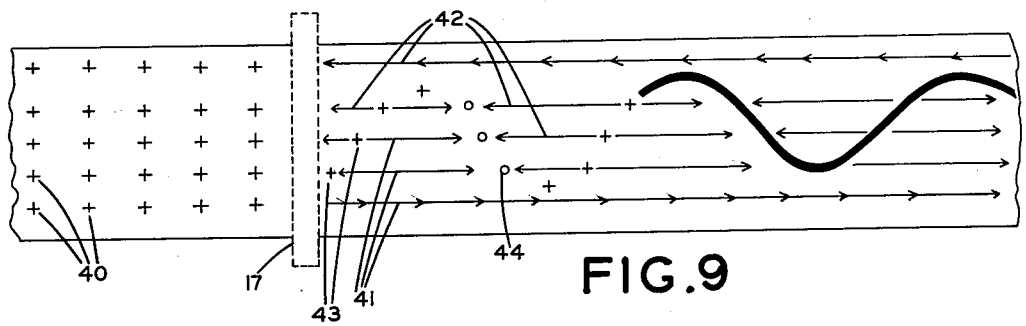
FIGURE 9 is a view similar to FIG. 5, where the record tape has been perpendicularly premagnetized before being recorded upon.

In accordance with the present invention, the technique of perpendicularly premagnetizing the record tape before recording the input signal thereon is extremely effective in providing a well defined, continuous inked trace of the recorded signal. The record tape is vertically premagnetized by passing the tape centrally between opposite poles of a magnet, with the poles being exposed to opposite faces of the record tape. Referring to FIG. 9, after the record tape has been premagnetized in this fashion there is a remanent magnetic field in the tape which is directed perpendicular to the plane of the tape, as indicated by the plus signs 40 in FIG. 9. This perpendicular field also is external to the tape.

After moving across the recording gap 17 on the recording head (to which a sine wave input signal is applied), at one side of the sine wave input signal recorded by the head the magnetic field in the tape is longitudinally magnetized in one direction, as indicated by the arrows 41 in FIG. 9. At the opposite side of the recorded sine wave the remanent magnetization in the tape is directed longitudinally in the opposite direction, as indicated by the arrows 42. The recorded sine wave is located in the boundary region between these oppositely directed longitudinal magnetic fields in the record tape. At the recorded sine wave the resultant magnetic fields are directed perpendicular to the plane of the record tape. These external perpendicular fields are designated in FIG. 9 by a series of plus signs 43 (indicating a field directed into the tape) and dots 44 (indicating a field directed out of the tape). When magnetic ink is applied to the record tape the magnetizable particles in the ink are attracted by these perpendicular fields and form a visual trace of the recorded sine wave. The remaining portions of the record tape, which have only longitudinal magnetic fields lying substantially wholly within the tape, do not attract the ink magnetically, but provide a clear, uninked background.

At those portions of the recorded signal where the slope of the recorded wave is appreciable, the strong oppositely directed longitudinal magnetic fields induced in the record tape by the recording head produce strong perpendicular external fields which are very effective in attracting and holding magnetic particles in the ink. This phenomenon is essentially the same as what takes place in the case of longitudinal premagnetization of the record tape. However, where the recorded signal is at a positive or negative peak, where the slope is zero, the perpendicular magnetic field due to the oppositely directed longitudinal magnetic fields in the record tape is substantially zero, as in the case of longitudinal premagnetization. In the case of vertical premagnetization, however, there remains at the positive and negative peaks a strong perpendicular magnetic field in the record tape due to its perpendicular premagnetization. This field is quite effective in accumulating and holding magnetic ink particles at the positive and negative peaks of the recorded wave to provide a continuous visual trace.

In addition, perpendicular premagnetization is advantageous in that in the absence of an input signal to the recording head there will be recorded a straight "no-signal" line on the record tape. With other types of premagnetization of the record tape it is necessary to have a high frequency excitation signal applied to the recording head in order to record such a "no-signal" trace.

Transverse Premagnetization

In a third embodiment of the present invention, the record tape is transversely premagnetized before recording the input signal thereon. Transverse premagnetization induces in the record tape magnetic fields which are directed from one edge of the tape to the other, as indicated by the arrows 50 in FIG. 10. After moving across the recording gap 17 on the recording head, at one side of the sine wave input signal recorded by the head the magnetic field in the tape extends longitudinally in one direction along the tape, as indicated by the arrows 51 in FIG. 10. At the opposite side of the recorded sine wave the magnetic field in the tape is in the opposite longitudinal direction, as indicated by the arrows 52 in FIG. 10. The recorded sine wave is located in the boundary region between these oppositely directed longitudinal magnetic fields in the record tape. At the recorded sine wave the resultant magnetic fields, caused by the oppositely directed longitudinal magnetic fields, are directed perpendicular to the plane of the record tape. These external perpendicular fields are designated respectively in FIG. 10 by a series of plus signs 53 (indicating a field directed into the tape) and circular dots 54 (indicating a field directed out of the tape). In addition, at the recorded sine wave there is a remanent transverse magnetic field, indicated by the arrows 55, caused by, and extending in the same direction as, the transverse premagnetization of the record tape.

When magnetic ink is applied to the record tape the magnetizable particles in the ink are attracted by the perpendicular fields at the recorded sine wave and the ink forms a visual trace of the recorded sine wave. The transverse fields at the recorded sign wave are completely within the tape, except at the edges of the tape, and are ineffective in attracting the ink.

Figure 10:
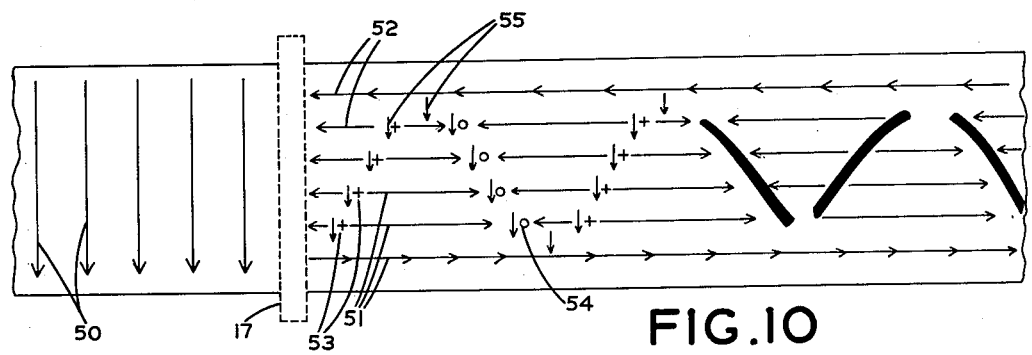
FIGURE 10 is a similar view, where the record tape has been subjected to transverse premagnetization before being recorded upon.

As in the case of longitudinal premagnetization, the visual trace tends to disappear at the positive and negative peaks, as indicated in FIG. 10, because at these locations the perpendicular magnetic fields in the magnetic tape approach zero. This effect can be avoided by superimposing a low amplitude, high frequency signal on the recording head, as described above in connection with longitudinal premagnetization.

Alternating Perpendicular Premagnetization

Figure 11:
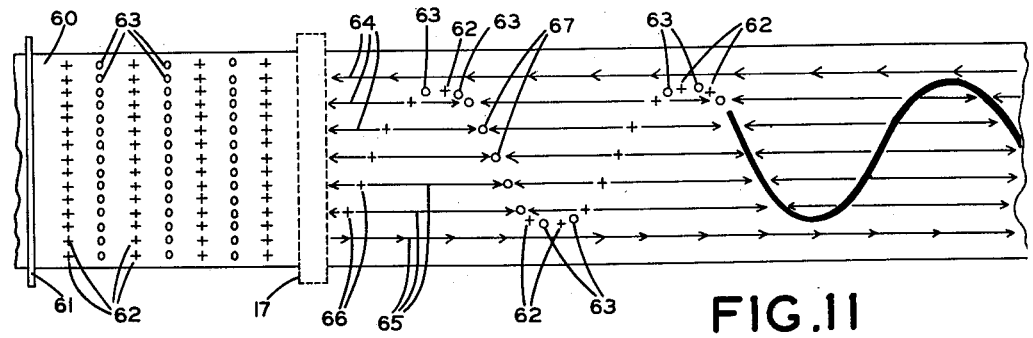
FIGURE 11 is a similar view, where the record tape has been subjected to alternating perpendicular premagnetization before being recorded upon.

In accordance with a fourth embodiment of the present invention, the record tape is premagnetized by a technique which may be termed "alternating perpendicular premagnetization." In this embodiment, referring to FIG. 11, the record tape 60 is premagnetized by moving it at constant speed past a bare copper wire 61 to which is applied a square wave excitation signal of suitable high frequency. The wire 61 is positioned contiguous to the record tape during premagnetization and, in response to the square wave excitation, induces perpendicular magnetic fields in the record tape designated by the plus signs 62 and circular dots 63 in FIG. 11. Because of the way in which this premagnetization is carried out, there are provided oppositely polarized magnetic fields in alternate sequence lengthwise along the record tape. Thus, for example, each positive pulse through wire 61 produces the perpendicular magnetic fields represented by the plus signs in a particular row transversely across the record tape, while the adjacent rows of circular dots on either side represent the returns of these fields. These perpendicular magnetic fields are also external to the tape. Preferably, the adjacent, oppositely polarized, perpendicular magnetic fields are so close to each other on the tape that when magnetic ink is applied to the tape the ink will form a substantially continuous layer. However, these adjacent oppositely polarized perpendicular fields cannot be so closely spaced that they substantially erase one another.

With the record tape having been premagnetized in this fashion, when the tape is moved across the recording gap 17 on the recording head to which a sine wave input signal is applied, at one side of the sine wave recorded by the head the magnetic field in the tape is longitudinally magnetized in one direction, as indicated by the arrows 64 in FIG. 11. At the opposite side of this recorded sine wave the remanent magnetic field in the tape is longitudinal in the opposite direction, as indicated by the arrows 65 in FIG. 11. At those portions of the recorded sine wave where the slope of the recorded wave is appreciable, the strong oppositely directed longitudinal magnetic fields induced in the record tape by the recording head produce strong perpendicular magnetic fields, indicated by the circular dots 66 and the plus signs 67 in FIG. 11. These perpendicular fields are also external to the tape. At the positive and negative peaks of the recorded signal, the perpendicular magnetic fields due to the oppositely directed longitudinal magnetic fields in the record tape are substantially zero. However, at these positive and negative peaks there remain strong perpendicular external magnetic fields which were induced by the premagnetization technique just described. The strong perpendicular external magnetic fields all along the recorded sine wave attract the magnetic particles in the ink so as to produce a continuous inked trace of the recorded input signal. The remaining portions of the record tape, which have only longitudinal magnetic fields lying substantially wholly within the tape, do not attract the ink magnetically but merely serve to provide a clear, uninked background.

From the foregoing it will be evident that this particular technique of premagnetization offers essentially the same advantages as the perpendicular premagnetization technique previously described.

Record Tape Movement

Figure 12:
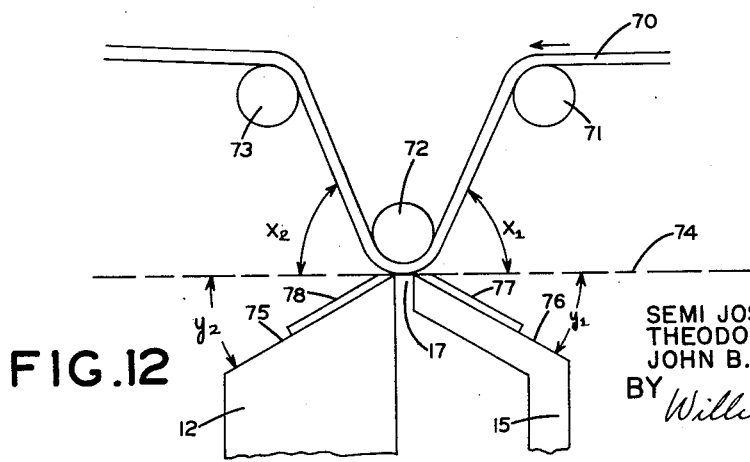
FIGURE 12 illustrates the manner in which the record tape is advanced across the recording gap of the recording head in accordance with one embodiment of the present invention.

In accordance with the present invention there is provided an arrangement which insures that the only flux which affects the record tape is that which appears across the recording gap. FIGURE 12 illustrates two structural arrangements which may be used singly or in combination for this purpose.

Referring to this figure, the magnetic record tape 70 passes around a roller 71 spaced from the recording head at one side of the recording gap 17, down toward the recording gap 17 and up around a second roller 72, which is closely positioned directly opposite the recording gap 17 of the recording head. The record tape then passes up around a third roller 73 spaced from the recording head at the opposite side of the recording gap. The rollers 71 and 73 are so located that the angle of approach, $x_1$, and the angle of departure, $x_2$, of the record tape with respect to a plane 74 from edge to edge across the recording gap are both in excess of a predetermined minimum. Also, the adjacent face 76 of the leg 16 on the core member 15 of the recording head is inclined at an angle, $y_1$, with respect to this plane and the laminated core structure 10, 11 of the recording head has its upper face 75 inclined at an angle, $y_2$, with respect to this plane. With this arrangement, the only signal flux affecting the tape is that which appears across the recording gap 17, and the record tape may be passed over the recording gap in either direction to obtain satisfactory recordings. The flux which leaks into the air at the faces 75 and 76 on the head at either side of the recording gap does not appreciably affect the tape because of the spacing between the tape and these faces, due to the illustrated arrangement for guiding the record tape as it advances. Such leakage flux would tend to erase the magnetic fields recorded on the tape by the flux appearing across the recording gap 17 or otherwise adversely affect the quality of the recording.

The same result can be achieved by providing a layer of non-magnetic material 77 on the face 76 of the recording head adjacent the recording gap 17 and a similar layer of non-magnetic material 78 on the face 75 of the laminated stock portion of the head adjacent the recording gap, as shown in FIG. 12. These non-magnetic layers 77 and 78 minimize the leakage of magnetic flux into the air from these faces on the head.

It is to be understood that these non-magnetic layers 77, 78 and the above-described arrangement for moving the tape across the recording gap 17 without passing near the adjacent faces 75, 76 on the head may be used either in combination, as shown in FIG. 12, or singly to accomplish the result of insuring that only the flux across the recording gap affects the record tape.

In addition, it is quate important to the successful operation of the present invention to move the record tape away from the recording gap 17 at an appreciable angle to the adjacent face of the recording head. (In FIG. 12 this angle is equal to $x_2$ plus $y_2$.) Preferably, the tape should move substantially directly away from the recording gap, so that this angle is a maximum. The reason for this is to insure that the remanent magnetic fields in the record tape induced by the flux appearing across the recording gap are contained substantially wholly within the tape and do not exert magnetic forces having substantial components external to the tape. Otherwise, these remanent fields would tend to attract magnetic ink particles, so that the background on the tape for the recorded trace would be inked, rather than clear. The tape drive arrangement illustrated in FIG. 12 is well adapted to achieve this result since the record tape moves substantially directly away from the recording head after passing across the recording gap 17.

While there have been disclosed herein certain preferred embodiments of the present invention it is to be understood that various modifications, omissions and refinements which depart from the disclosed embodiments may be adopted without departing from the spirit and scope of the present invention. Furthermore, it is to be understood that any suitable technique, other than by applying magnetic ink, may be employed to apply visible magnetic particles to the record tape to form the visible trace of the recorded signal. For example, the magnetic particles may be sprayed on by means of an air or other gaseous stream. Also, where desired the visible trace may be transferred from the magnetic record tape onto a paper record chart for display purposes, such as by pressure contact between the magnetic tape and the record chart or any other suitable expedient.

We claim:

Apparatus for magnetic oscillography comprising, in combination, a magnetic recording head having an elongated recording gap, a premagnetized flexible magnetic record tape, means for moving said record tape through a flux field bridging said record gap in a direction perpendicular to the direction in which said gap is elongated, means producing magnetic flux in said recording head which flows across said gap in opposite directions at opposite ends of the gap and leaves a magnetically neutral region in the gap between the ends of the gap to induce in the moving record tape remanent longitudinal magnetic fields contained substantially completely within the tape and which are oppositely polarized on opposite sides of the portion of the record tape passing over said magnetically neutral region in the gap, means for impressing a low amplitude excitation signal in the said recording head having a frequency several times that of said signal to be recorded, and means for applying an input signal to the recording head which shifts the location of said magnetically neutral region lengthwise along the gap as a function of the amplitude of said input signal while the record tape is moving across the gap to record on the tape a magnetic trace of said input signal which exerts magnetic forces external to the tape, non-magnetic material means disposed between the recording head and said record tape on either side of said recording gap to shield the record tape from leakage flux from the recording head thereat, and magnetizable particles connected to the surface of the tape at the location of said external forces to form a single continuous trace.

References Cited in the file of this patent
UNITED STATES PATENTS 2,743,320  Daniels et al. _____ Apr. 24, 1956

FOREIGN PATENTS 895,063  Germany _____ Oct. 29, 1953

OTHER REFERENCES

Electronics, April 1953, pages 116–120.